US008420996B2

(12) United States Patent
Rissa et al.

(10) Patent No.: US 8,420,996 B2
(45) Date of Patent: Apr. 16, 2013

(54) INTENSITY ESTIMATION USING BINARY SENSOR ARRAY WITH SPATIALLY VARYING THRESHOLDS

(75) Inventors: Tero P. Rissa, Siivikkala (FI); Samu T. Koskinen, Tampere (FI); Tuomo Maki-Marttunen, Tampere (FI); Matti Viikinkoski, Tampere (FI)

(73) Assignee: Nokia Corporation, Espoo (FI)

( * ) Notice: Subject to any disclaimer, the term of this patent is extended or adjusted under 35 U.S.C. 154(b) by 640 days.

(21) Appl. No.: 12/645,721

(22) Filed: Dec. 23, 2009

(65) Prior Publication Data

US 2011/0149274 A1 Jun. 23, 2011

(51) Int. Cl.
*G01J 1/42* (2006.01)
*H03F 3/08* (2006.01)
*H01L 27/00* (2006.01)

(52) U.S. Cl.
USPC .................. 250/208.2; 250/214 R; 250/208.1

(58) Field of Classification Search ............... 250/208.1, 250/226, 214 R, 216, 336.1; 348/222.1, 348/234, 272, 294, 297; 257/431, 432, 440, 257/80, 85, 257, 290, 291, 292, 258
See application file for complete search history.

(56) References Cited

U.S. PATENT DOCUMENTS

| 5,036,546 | A * | 7/1991 | Gottesman et al. | 382/321 |
|---|---|---|---|---|
| 5,786,597 | A * | 7/1998 | Lingren et al. | 250/370.09 |
| 2003/0020827 | A1 * | 1/2003 | Bean et al. | 348/363 |
| 2004/0096820 | A1 * | 5/2004 | Rich et al. | 435/5 |
| 2008/0170796 | A1 * | 7/2008 | Hwang et al. | 382/266 |
| 2009/0152664 | A1 * | 6/2009 | Klem et al. | 257/440 |
| 2010/0252716 | A1 | 10/2010 | Kalevo et al. | 250/208.1 |

FOREIGN PATENT DOCUMENTS

WO   WO 2009/136989 A1   11/2009

OTHER PUBLICATIONS

Sbaiz L et al., "The Gigavision Camera", IEEE International Conference on Acoustics, Speech and Signal Processing, (2009), (pp. 1093-1096).
Yang F et al., "Image Reconstruction in the Gigavision Camera", (2009), (pp. 2212-2219).
Yang F et al. "On Pixel Detection Threshold in the Gigavision Camera", (2010), (pp. 75370G-1 through 75370G-8).
Yang F et al., "An Optimal Algorithm for Reconstructing Images from Binary Measurements", (2010), (12 pages).
Fossum, E.R., "What to do with Sub-Diffraction-Limit (SDL) Pixels? A Proposal for a Gigapixel Digital Film Sensor (DFS)", Proc. of the 2005 IEEE Workshop on Charge-Coupled Devicves and Advanced Image Sensors, Karuizawa, Japan, Jun. 2005, p. 214-217.
Sbaiz, L., et al., "The Gigavision Camera", Proc. of IEEE International Conference on Acoustics, Speech and Signal Processing (ICASSP), 2009, p. 1093-1096.
Yang, F., "Image Reconstruction in the Gigavision Camera", ICCV workshop OMNIVIS 2009, 8 pgs.
Khemka, A., et al., "Inverse problems in atmospheric dispersion with randomly scattered sensors", Digital Signal Processing 16; Mar. 25, 2005, p. 636-651.

* cited by examiner

*Primary Examiner* — Que T Le
*Assistant Examiner* — Jennifer Bennett
(74) *Attorney, Agent, or Firm* — Harrington & Smith

(57) ABSTRACT

An apparatus includes an array containing N sub-diffraction limit light sensors each having an associated light absorption activation threshold for switching from a reset state to an activated state, where the light absorption activation values lie within a range of values. The apparatus further includes a processor connected with a memory including computer program code, where the memory and computer program code are configured to, with the processor, cause the apparatus at least to perform estimating an intensity of light that illuminates the array based on electrical outputs of the array.

20 Claims, 5 Drawing Sheets

INTENSITY ESTIMATION USING BINARY SENSOR ARRAY WITH SPATIALLY VARYING THRESHOLDS

TECHNICAL FIELD

The exemplary and non-limiting embodiments of this invention relate generally to imaging systems, methods, devices and computer programs and, more specifically, relate to imaging systems that use a light sensor array comprised of an array of light sensors that generate a binary output signal.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

There has been recent interest in replacing the conventional CCD (charge coupled device) photosensor with a two-dimensional array of small binary photosensors. Reference in this regard may be made to, for example, E. R. Fossum, What to do with Sub-Diffraction-Limit (SDL) Pixels? A Proposal for a Gigapixel Digital Film Sensor, Proc. of the 2005 IEEE Workshop on Charge-Coupled Devices and Advanced Image Sensors, Karuizawa, Japan, June 2005; L. Sbaiz, F. Yang, E. Charbon, S. Süsstrunk, M. Vetterli, The gigavision camera, Proc. of IEEE International Conference on Acoustics, Speech and Signal Processing (ICASSP), 2009, p. 1093-1096; and L. Sbaiz, F. Yang, E. Charbon, S. Süsstrunk, M. Vetterli, Image reconstruction in gigavision camera, ICCV workshop OMNIVIS 2009.

Since the size of a binary photosensor is small compared to a traditional photosensor (e.g., a CCD photosensor), it can be reasonably assumed that a number of sensor elements (e.g., 16-256 elements) of a binary sensor array is smaller than that of the Airy disc (e.g., could be located within the size of an Airy disc). Thus, it is also reasonable to assume that the photon distribution on the sensor array can be modeled as a homogenous two-dimensional spatial Poisson process. The task then becomes to determine the intensity of light, given the output of binary sensor array.

A binary sensor is a simple sensor with only two states: initially zero, and after a number of detected photons exceeds some predetermined threshold, the state changes to one. Prior art binary sensor systems have considered only fixed threshold binary sensors.

SUMMARY

The foregoing and other problems are overcome, and other advantages are realized, in accordance with the exemplary embodiments of this invention.

In a first aspect thereof the exemplary embodiments of this invention provide an apparatus that comprises an array containing N sub-diffraction limit light sensors each having an associated light absorption activation threshold for switching from a reset state to an activated state, where the light absorption activation values lie within a range of values. The apparatus further comprises a processor connected with a memory including computer program code, where the memory and computer program code are configured to, with the processor, cause the apparatus at least to perform estimating an intensity of light that illuminates the array based on electrical outputs of the array.

In a further aspect thereof the exemplary embodiments of this invention provide a method that comprises providing an array containing N sub-diffraction limit light sensors each having an associated light absorption activation threshold for switching from a reset state to an activated state, where the light absorption activation values lie within a range of values; and estimating an intensity of light that illuminates the array based on electrical outputs of the array.

BRIEF DESCRIPTION OF THE DRAWINGS

The foregoing and other aspects of the exemplary embodiments of this invention are made more evident in the following Detailed Description, when read in conjunction with the attached Drawing Figures, wherein.

DETAILED DESCRIPTION

The exemplary embodiments of this invention relate to digital camera light sensor technologies, and more specifically to the binary type sensor ("receptor") with potentially a very high count of pixels ("bit elements"), possibly over 1 billion ("giga", $1 \times 10^9$). As was noted above, "binary" implies that each such sensor or receptor element may have only two possible values: zero (not exposed) or one (exposed). The exemplary embodiments of this invention are also related to so-called sub-diffraction limit sensors or receptors. This implies that the image projected on the receptor is not perfectly sharp, but is more or less "fuzzy" as compared to the size of the sensor element.

The exemplary embodiments of this invention consider a more general case than those previously considered, where each binary sensor in an array has a fixed but otherwise arbitrary threshold. The threshold of each binary sensor in the array may be assumed to be initially unknown.

Two different cases are considered in the following description. In a first case some training data is assumed to available, i.e., the binary sensor array is tested and intensity values of light and the corresponding outputs of the binary sensor array are recorded. The threshold of each binary sensor in the array can then be determined using, for example, Bayesian inference. In a second case it is assumed that no training data is available. This second case can be further divided into two subcases, in the first subcase (of most interest to the exemplary embodiments of this invention) the probability mass function of thresholds is known or is at least approximated. In the second subcase, nothing is known about thresholds.

The exemplary embodiments of this invention address and solve the problem of estimating photon intensity using a finite binary sensor array. As opposed to using an array of homogenous binary sensors, an array of binary sensors with spatially varying thresholds is provided.

Figure 1A:
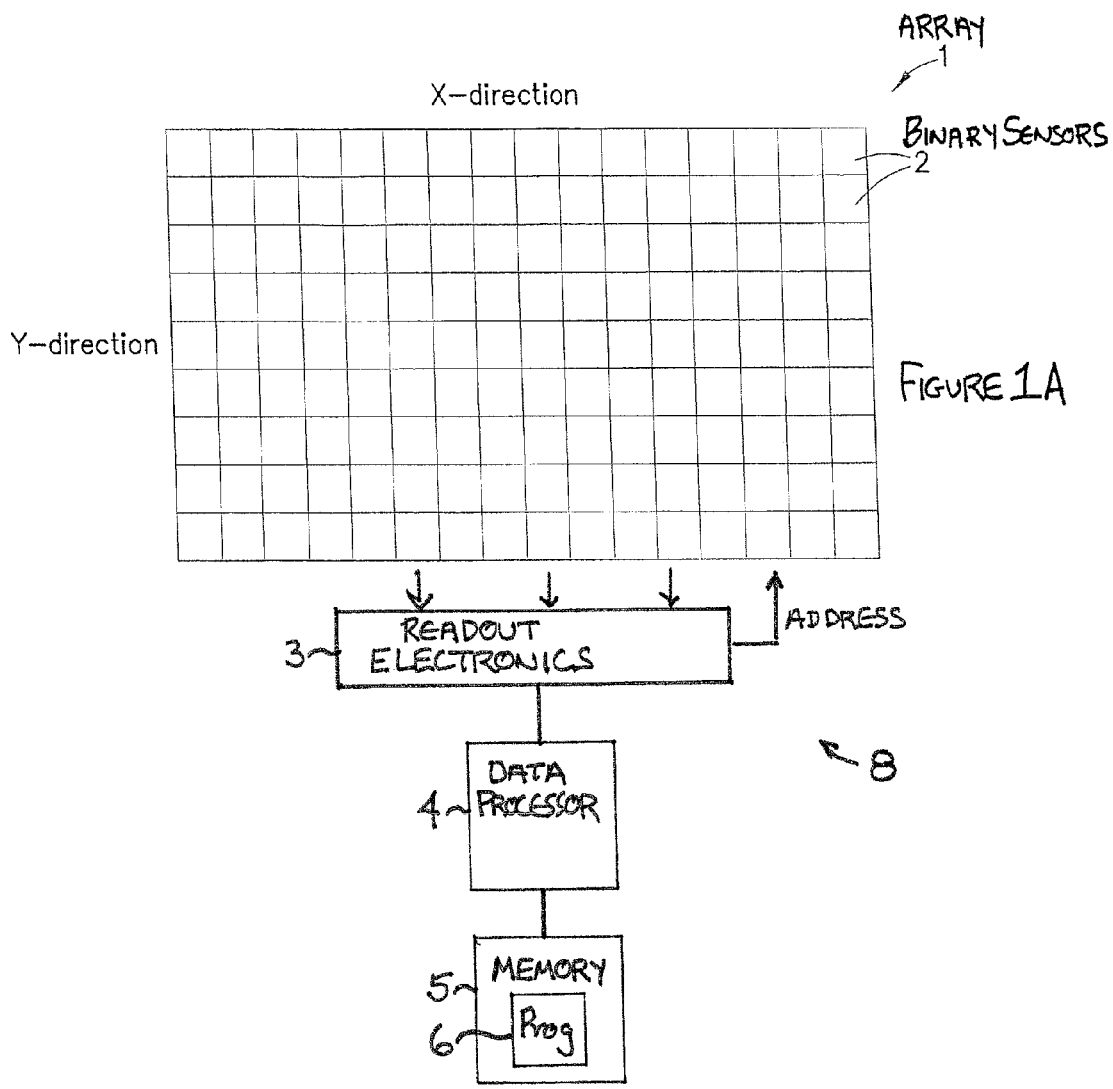
FIG. 1A shows a top view of an exemplary array of binary sensors.

Reference can be made to FIG. 1A for showing a top view of an exemplary array 1 of binary sensors 2. The sensors 2 are arranged (in this non-limiting embodiment) in a regular grid pattern defined by x and y axes. In total there are N sensors, where N has a value in a range of, for example, about $10^6$ to about $10^9$ or greater. Associated with the array 1 is a block of readout electronics 3 configured to address the sensors 2 and read out the sensor values, and a data processor 4 connected with a data storage medium embodied as a memory 5. The memory 5 stores a computer software program (Prog) 6 that, when executed by the data processor 4, enables the sensor outputs received via the readout electronics 3 to be to be processed.

Figure 5:
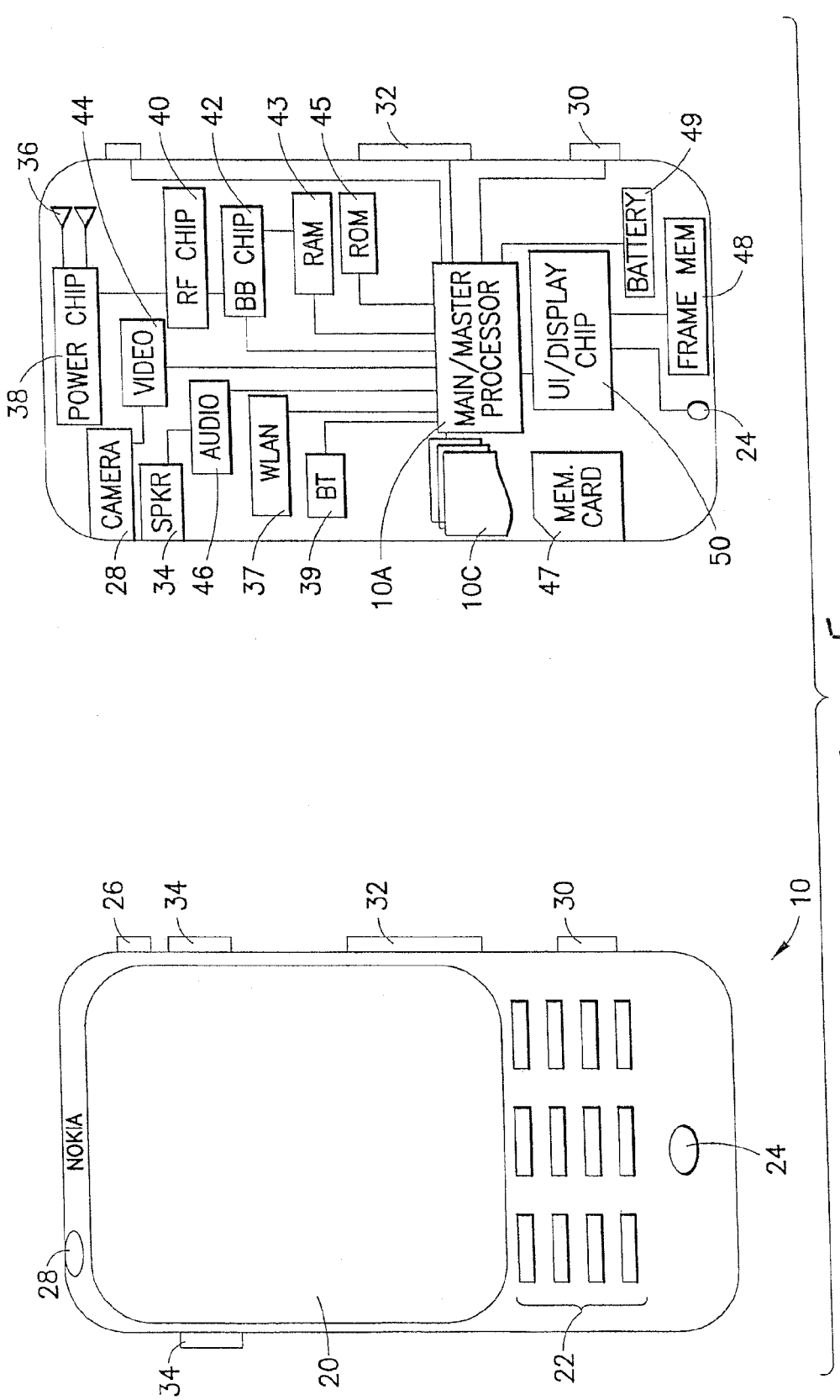
FIG. 5 shows a block diagram of a device that may be constructed to include the image sensor in accordance with the exemplary embodiments of this invention.

The various components shown in FIG. 1A can embody an image capture (camera) chip, chip-set or module 8 that can be used in a stand-alone manner, or that can be incorporated into another device or apparatus. One exemplary embodiment is shown in FIG. 5, where the camera module 8 of FIG. 1A may form all or part of a camera 28 that is incorporated into a user equipment (e.g., into a cellular phone).

Figure 1B:
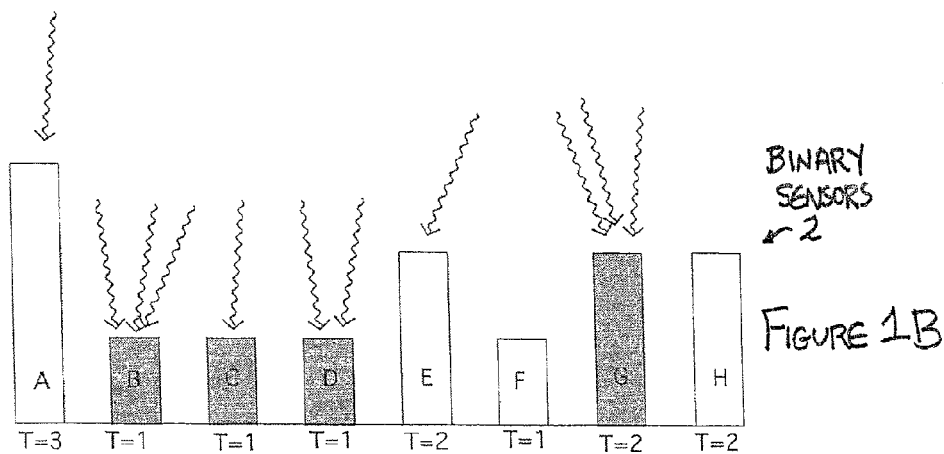
FIG. 1B shows the activation of binary sensors.

FIG. 1B shows an example of the activation of some of the binary sensors 2. Sensors F and H are not activated, since no photon impinges on them. Sensors B, C, D and G are activated (i.e., assume a logic one state), because they receive (absorb) a number of photons equal to or greater than their respective threshold value. Sensors A and E remain inactive (i.e., remain in the logic zero state), because they receive (absorb) a number of photons less than their respective threshold value.

Assume a case that the threshold of each binary sensor 2 is fixed but unknown. Moreover, assume that training data is available. First the training data is used to solve (or estimate, depending on quantity of data) the threshold of each binary sensor 2. Then, given an output of the exposed binary sensor array 1, intensity is estimated using the knowledge of the thresholds of the binary sensors 2 and their placements (locations).

Assume that there are N sensors 2 in the two-dimensional array 1, enumerated 1 to N. The state $S_i$ of i th binary sensor is a Bernoulli random variable, and the threshold $T_i$ of the sensor i is discrete positive random variable. Assume further that the state of a particular binary sensor 2 is independent of the states of other sensors 2. Our first task is to determine the threshold of each sensor, given a set S of training data, comprising the outputs of binary sensors $\{s_i^j\}$ and the corresponding intensities $\lambda^{(j)}$, where i=1, ..., N and j=1, ..., |S|. The threshold of each sensor 2 is determined independently of the threshold of the others. The probability that the sensor i is activated given its threshold $T_i = t_i$ and light intensity $\lambda$ is $$P(S_i = 1 \mid t_i, \lambda) = 1 - \sum_{k=0}^{t_i-1} \frac{\lambda^k e^{-\lambda}}{k!}.$$

From this it follows that the likelihood function for threshold $T_i$ can be written as $$P(S_i \mid T_i = t_i) = \prod_j P(S_i = 1 \mid t_i, \lambda^j)^{s_i^j} P(S_i = 0 \mid t_i, \lambda^j)^{1-s_i^j},$$

where $S_i$ is the subset of S corresponding to the i th sensor. The mode of the posterior of threshold $T_i$ of the sensor i can be estimated by using, for example, the maximum likelihood estimate.

The assumption was made that the thresholds of the sensors 2 are independent of each other. If the thresholds of neighboring sensors are not independent, the theory of Markov random fields can be used to speed up learning (e.g., see G. Winkler, Image Analysis, Random Fields and Markov chain Monte Carlo methods Springer, 2003).

Assume now that that the threshold $T_i$ of the i th binary sensor is determined for all i=1, ..., N. Given the output $(s_j)_{j=1}^N$ of the binary sensor array 1, a next step is to estimate the photon intensity. As before, the likelihood function for intensity $\lambda$ may be written as $$P\big((s_j)_{j=1}^N \mid \lambda\big) = \prod_{i=1}^N P(S_i = 1 \mid \lambda)^{s_i} P(S_i = 0 \mid \lambda)^{1-s_i}.$$

The estimate for intensity $\lambda$ can be now obtained by using, e.g., maximum a posteriori estimation with prior distribution $$p(\lambda) \propto \frac{1}{\lambda}.$$

In the foregoing analysis Bayesian methods were used for estimating photon intensity. However, the use of feedforward neural networks is also well suited to the task (e.g., see S. Haykin, Neural Networks: Comprehensive Foundation, IEEE Press, 2nd edition, 1999). In general, available training data can be used to train a neural network to estimate intensity from the sensor array output.

Consider estimation without the use of training data. More specifically, consider how to determine the intensity, given the output of the binary sensor array 1 and the probability mass function of thresholds. This particular case differs from the previous case as the thresholds of the binary sensors 2 are not determined explicitly. Instead, the knowledge of the probability mass function and the number of activated sensors 2 is used to yield an estimate of the intensity.

Assume that the threshold values of the binary sensor array 1 are distributed according to the probability mass function $p_T(k)$. The goal is to determine the intensity, given the output of the binary sensor array 1. The probability that a particular sensor 2 is activated given intensity $\lambda$ is $$P(S = 1 \mid \lambda) = \sum_{k=1}^M p_T(k) P(S = 1 \mid T = k, \lambda),$$

where M is the maximum threshold in the sensor binary array 1 and $$P(S=1 \mid T=k, \lambda) = 1 - \sum_{i=0}^{k-1} \frac{\lambda^i e^{-\lambda}}{i!}.$$

The probability that there are l lit sensors 2 given the intensity λ is $$P(l\, lit\, sensors \mid \lambda) = \binom{N}{l} P(S=1 \mid \lambda)^l P(S=0 \mid \lambda)^{N-l}.$$

The maximum likelihood estimate for λ is the value that maximizes the previous equation. Note that the exemplary embodiments of this invention are not limited to the foregoing estimator, and that other estimators can also be used.

Figure 2:
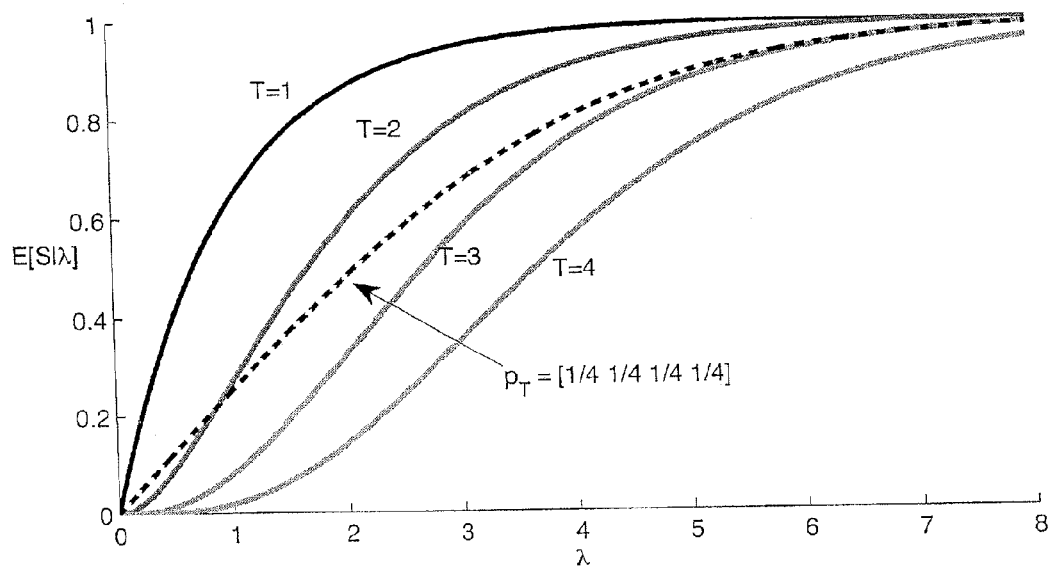
FIG. 2 graphically depicts: the expectation value of the number of activated sensors with respect to intensity.

FIG. 2 graphically depicts: the expectation value of the number of activated sensors 2 with respect to the intensity λ. For the solid lines the sensor threshold remained constant with values T=1, T=2, T=3 and T=4, and for the dashed line the threshold values were uniformly distributed between 1 and 4.

Figure 3:
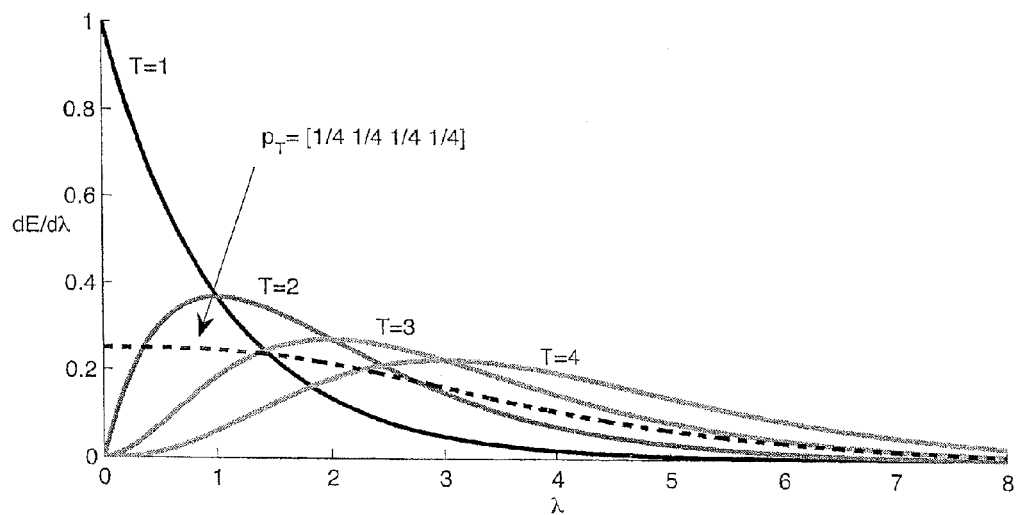
FIG. 3 graphically depicts the derivatives of the expectation values of the number of activated sensors with respect to intensity.

In FIG. 3 the performance of different binary sensor arrays 1 is compared. More specifically, FIG. 3 graphically depicts the derivatives of the expectation values of the number of activated sensors 2 with respect to the intensity λ. For the solid lines the sensor threshold remained constant with values T=1, T=2, T=3 and T=4, and for the dashed line the threshold values were uniformly distributed between 1 and 4.

As may be expected, the binary sensor array 1 where all the threshold values are equal to one performs best when the light intensity is low. On the other hand, when all the thresholds are equal to four, performance is good when the intensity is high, but the sensor array 1 performs less what is acceptable at low intensities. The sensor array 1 where the thresholds are uniformly distributed combines the best features of both types of sensor arrays, i.e., the array 1 is able to yield information even when the array with threshold 1 is almost saturated, and the array 1 is also relatively sensitive at low intensity levels, where the array with all the thresholds equal to four is basically non-functional.

The case of a binary sensor array 1 with spatially varying thresholds is important. For example, if a binary sensor array 1 with single photon sensitivity were to be constructed, such as by using photolithographic techniques, the thresholds of the binary sensors 2 in the array 1 will vary somewhat as a result of imperfections in the fabrication process. As was shown above, by taking this into account the performance of the binary sensor array 1 can be improved. Note that the thresholds also can be varied by purpose and with different degrees of controllability (e.g., using a known distribution but with unknown locations). It is further noted that information from the manufacturing process can be fed into the method in order to improve performance.

Figure 4:
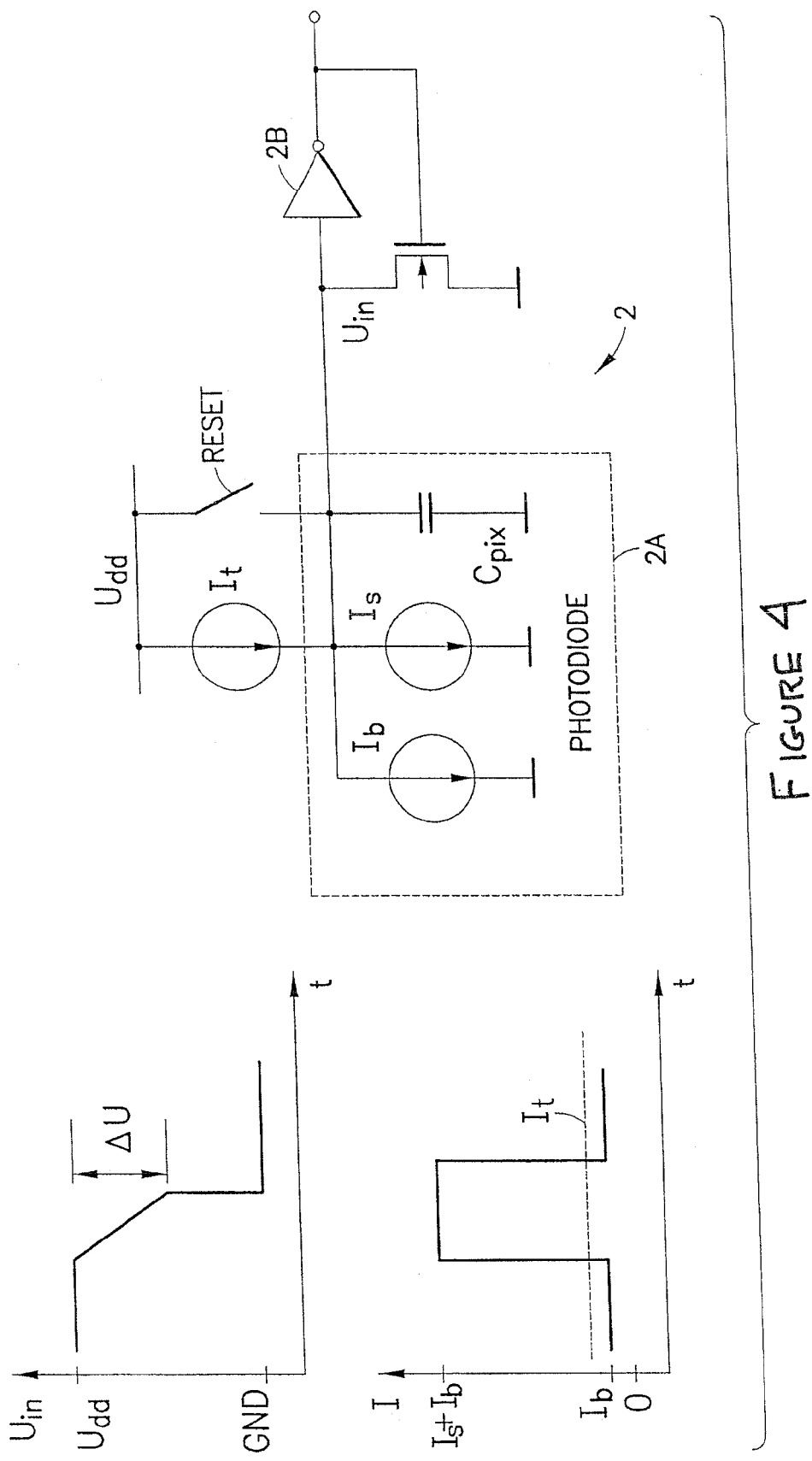
FIG. 4 depicts one suitable and non-limiting type of circuitry to implement the receptors of the light sensor of FIG. 1A.

One suitable and non-limiting type of circuitry to implement the receptors 2 is shown in FIG. 4. In this case each receptor 2 includes a photodiode 2A connected with a simple inverter-based comparator circuit 2B for one-bit amplitude quantification. An adjustable threshold current may be used to prevent triggering due to background illumination. A receptor (pixel) is triggered when the signal current (plus background current) exceeds the threshold current $I_t$, and the voltage $U_{in}$ across $C_{pix}$ due to the discharging current $I_s + I_b - I_t$ goes below the threshold voltage ($\sim -U_{dd}/2$) of the comparator 2B. Assuming that $I_t$ is small compared with the amplitude of the signal pulse, the sensitivity of a pixel is determined by the optical energy $E_{pix}$ needed for discharging the input capacitance of a pixel:

$$E_{pix} \approx (C_{pix} \Delta U)/SK_F,$$

where $C_{pix}$ is the total input capacitance of a pixel, comprising the photodiode and circuit input capacitances, ΔU is the voltage change at the input needed to trigger the comparator 2B, S is the photodiode responsivity and $K_F$ the pixel fill factor. As non-limiting examples, other possible approaches include using avalanche or impact ionization to provide in-pixel gain, or using quantum dots.

Note that as described thus far the threshold variability of the individual sensors 2 in the array 1 may be assumed to result from the inherent variability in the array 1 fabrication process (e.g., due to differences in material uniformity, differences in photolithographic mask uniformity, differences in dopant levels, dopant concentrations and the like).

However, it is also within the scope of the exemplary embodiments to intentionally induce threshold variability amongst the sensors 1. This may achieved, for example, in an electrical manner such as by selectivity setting the above-referenced threshold current so as to differ between sensors 1 and/or between groups of sensors 1. In this manner it can become possible to alter or tune somewhat the shape of the dashed line shown in FIGS. 2 and 3.

FIG. 5 illustrates an exemplary and non-limiting embodiment of a device, such as user equipment (UE) 10, in both plan view (left) and sectional view (right). In FIG. 5 the UE 10 has a graphical display interface 20 and a user interface 22 illustrated as a keypad but understood as also encompassing touch screen technology at the graphical display interface 20 and voice recognition technology received at the microphone 24. A power actuator 26 controls the device being turned on and off by the user.

The exemplary UE 10 includes the camera 28 which is shown as being forward facing (e.g., for video calls) but may alternatively or additionally be rearward facing (e.g., for capturing images and video for local storage). The camera 28 is controlled by a shutter actuator 30 and optionally by a zoom actuator 30 which may alternatively function as a volume adjustment for speaker(s) 34 when the camera 28 is not in an active mode.

The camera 28 may be assumed to include an image sensor array 1 that is constructed and operated in accordance with the exemplary embodiments of this invention, as described in detail above. As was noted above, the camera 28 may include the camera module 8 shown in FIG. 1A.

Within the sectional view of FIG. 5 are seen multiple transmit/receive antennas 36 that are typically used for cellular communication. The antennas 36 may be multi-band for use with other radios in the UE. The power chip 38 controls power amplification on the channels being transmitted and/or across the antennas that transmit simultaneously where spatial diversity is used, and amplifies the received signals. The power chip 38 outputs the amplified received signal to the radio frequency (RF) chip 40 which demodulates and down-converts the signal for baseband processing. The baseband (BB) chip 42 detects the signal which is then converted to a bit stream and finally decoded. Similar processing occurs in reverse for signals generated in the apparatus 10 and transmitted from it.

Signals going to and from the camera 28 may pass through an image/video processor 44 that encodes and decodes the various image frames. A separate audio processor 46 may also be present controlling signals to and from the speakers 34 and the microphone 24. The graphical display interface 20 is refreshed from a frame memory 48 as controlled by a user interface chip 50 which may process signals to and from the display interface 20 and/or additionally process user inputs from the keypad 22 and elsewhere.

Certain embodiments of the UE 10 may also include one or more secondary radios such as a wireless local area network radio WLAN 37 and a Bluetooth radio 39, which may incorporate an antenna on the chip or be coupled to an antenna off the chip.

Throughout the apparatus are various memories such as random access memory RAM 43, read only memory ROM 45, and in some embodiments there may be removable memory such as the illustrated memory card 47 on which the various programs 10C are stored. All of these components within the UE 10 are normally powered by a portable power supply such as a battery 49.

The processors 38, 40, 42, 44, 46, 50, if embodied as separate entities in a UE 10, may operate in a slave relationship to the main processor 10A, 12A, which may then be in a master relationship to them. Embodiments of this invention may be disposed across various chips and memories as shown, or disposed within another processor that combines some of the functions described above for FIG. 5 Any or all of these various processors of FIG. 5 access one or more of the various memories, which may be on chip with the processor or separate there from.

The various integrated circuits (e.g., chips 38, 40, 42, etc.) that were described above may be combined into a fewer number than described and, in a most compact case, may all be embodied physically within a single chip.

In other embodiments the user equipment may not have wireless communication capability. In general the user equipment could be, for example, a personal digital assistant that includes the camera 28, a personal computer (e.g., a laptop or notebook computer) that includes the camera 28, a gaming device that includes the camera 28, or simply a digital camera device, as several non-limiting examples.

The use and application of the exemplary embodiments of this invention provides a number of technical advantages and effects. For example, a binary sensor array 1 containing binary sensors 2 that have (by nature) variable thresholds, and that would conventionally be considered as un-usable since conventional approaches would assume some known (constant) sensor threshold, can still be used to form images. Further, by selecting the distribution of the thresholds, even in the case where there is uncontrollable variability, the imaging performance (quality) of the array 1 of binary sensors 2 can be improved.

Based on the foregoing it should be apparent that the exemplary embodiments of this invention provide a method, apparatus and computer program(s) to estimate light intensity that illuminates an array containing N sub-diffraction limit light sensors.

Figure 6:
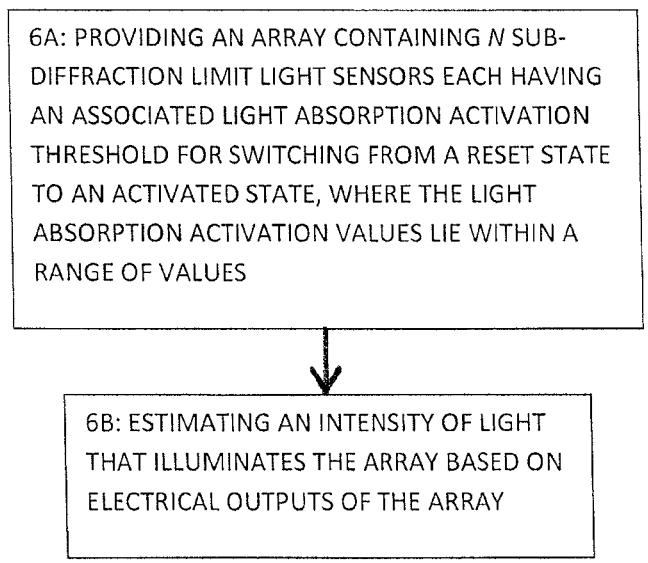
FIG. 6 is a logic flow diagram that illustrates the operation of a method, and a result of execution of computer program instructions embodied on a computer readable memory, in accordance with the exemplary embodiments of this invention.

FIG. 6 is a logic flow diagram that illustrates the operation of a method, and a result of execution of computer program instructions, in accordance with the exemplary embodiments of this invention. In accordance with these exemplary embodiments a method performs, at Block 6A, a step of providing an array containing N sub-diffraction limit light sensors each having an associated light absorption activation threshold for switching from a reset state to an activated state, where the light absorption activation values lie within a range of values. In Block 6B there is a step of estimating an intensity of light that illuminates the array based on electrical outputs of the array.

In the method as described in the preceding paragraph, the step of estimating uses training data to determine the light absorption activation threshold of each sensor and, based on the electrical outputs of the array, to estimate the intensity using the determined light absorption activation thresholds of the sensors and their locations. Estimating may use a Bayesian method, or it may use a feedforward neural network, where the training data is used to train the neural network to estimate intensity from the electrical outputs of the array.

In the method as described in FIG. 6, the step of estimating uses the electrical output of the array to determine a number of activated sensors and a probability mass function to determine a distribution of the light absorption activation thresholds of the sensors. Estimating the intensity can use a maximum likelihood estimate.

In the method as described in the preceding paragraphs, where N is in a range of about $10^6$ to about $10^9$ or greater, and where the light absorption activation values lie within a range of values of about 1 to about 4.

In the method as described in the preceding paragraphs, where the method is executed in a camera module embodied in a user device.

The various blocks shown in FIG. 6 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors and a digital signal processor or processors that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while shown in FIG. 1A as a two dimensional array 1 of binary optical sensors 2, in other embodiments the array 1 may be a three dimensional array of binary optical sensors (i.e., there could be further image sensors 2 disposed along a z-axis of the array 1, such as is described in copending U.S. patent application Ser. No. 12/384,549, filed Apr. 6, 2009, "Image Sensor", Ossi M. Kalevo, Samu T. Koskinen, Terro Rissa).

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. An apparatus, comprising:
  a plurality of sub-diffraction limit light sensors wherein each sensor has an associated activation threshold for switching an output state of the sensor from a first state to a second state and wherein the activation thresholds of at least some of the sensors are defined by different numbers of photons;
  a processor; and
  a memory including computer program code,
  wherein the memory and computer program code are configured to, with the processor, cause the apparatus at least to perform estimating light incident on the plurality of sensors by interpreting the output states of the plurality of sensors in dependence upon a distribution of different activation thresholds of the sensors, wherein the different activation thresholds are defined by different numbers of photons.

2. An apparatus as claimed in claim 1, wherein the sensors are binary sensors having as output states only the first state and the second state.

3. An apparatus as claimed in claim 1, wherein the apparatus is configured to convert a spatial distribution of output states to a spatial distribution of incident light, in dependence upon the distribution of different activation thresholds of the sensors.

4. An apparatus as claimed in claim 1, wherein estimating uses a Bayesian method.

5. An apparatus as claimed in claim 1, wherein the activation thresholds are controlled.

6. An apparatus as claimed in claim 5, wherein the activation thresholds are actively controlled in an electrical manner.

7. An apparatus as claimed in claim 1, wherein the plurality of sensors is arranged in a regular grid.

8. An apparatus as claimed in claim 1, wherein the plurality of sensors comprises more than $10^6$ sensors.

9. An apparatus as claimed in claim 1, embodied as a camera in a user device.

10. A method, comprising:
  providing a plurality of sub-diffraction limit light sensors wherein each sensor has an associated activation threshold for switching an output state of the sensor from a first state to a second state and wherein the activation thresholds of at least some of the sensors are defined by different numbers of photons; and
  estimating light incident on the plurality of sensors by interpreting the output states of the plurality of sensors in dependence upon a distribution of different activation thresholds of the sensors, wherein the different activation thresholds are defined by different numbers of photons.

11. The method of claim 10, comprising using binary sensors having as output states only the first state and the second state.

12. The method of claim 10, comprising converting a spatial distribution of output states to a spatial distribution of incident light, in dependence upon the distribution of different activation thresholds of the sensors.

13. The method of claim 10, wherein estimating uses a Bayesian method.

14. The method of claim 10, comprising using training data to determine the distribution of different activation thresholds of the sensors, and using electrical outputs of the plurality of sensors and the sensors' locations to estimate light using the determined distribution of different activation thresholds of the sensors.

15. The method of claim 10, wherein estimating uses the electrical output of the plurality of sensors to determine a number of activated sensors and a probability mass function to determine the distribution of different activation thresholds of the sensors.

16. A non-transitory computer-readable storage medium encoded with instructions that, when executed by a processor, at least perform estimating light incident on a plurality of sensors by interpreting output states of the plurality of sensors in dependence upon a distribution of different activation thresholds of the sensors, wherein the different activation thresholds are defined by different numbers of photons, and each sensor has an associated activation threshold for switching an output state of the sensor from a first state to a second state.

17. The non-transitory computer-readable storage medium as claimed in claim 16, wherein the sensors are binary sensors having as output states only the first state and the second state.

18. The non-transitory computer-readable storage medium as claimed in claim 16, wherein the instructions, when executed, convert a spatial distribution of output states to a spatial distribution of incident light, in dependence upon the distribution of different activation thresholds of the sensors.

19. The non-transitory computer-readable storage medium as claimed in claim 16, wherein estimating uses a Bayesian method.

20. The non-transitory computer-readable storage medium as claimed in claim 16, wherein the instructions, when executed, determine the distribution of different activation thresholds of the sensors.

* * * * *